United States Patent [19]

Herrmann et al.

[11] 4,276,970

[45] Jul. 7, 1981

[54] HIGH SPEED HYDRODYNAMIC BRAKE

[75] Inventors: Berthold Herrmann; Hans Lindenthal, both of Heidenheim, Fed. Rep. of Germany

[73] Assignee: Voith Getriebe KG, Fed. Rep. of Germany

[21] Appl. No.: 104,673

[22] Filed: Dec. 17, 1979

[30] Foreign Application Priority Data

Dec. 22, 1978 [DE] Fed. Rep. of Germany ....... 2855654

[51] Int. Cl.³ ............................................. F16D 57/02
[52] U.S. Cl. ..................................... 188/296; 303/11
[58] Field of Search ............... 188/290, 294, 296, 299; 303/10, 11, 116

[56] References Cited

U.S. PATENT DOCUMENTS

3,989,127 11/1976 Staudenmaier et al. ............. 188/296

FOREIGN PATENT DOCUMENTS

2533514 4/1976 Fed. Rep. of Germany .

*Primary Examiner*—Duane A. Reger

*Attorney, Agent, or Firm*—Ostrolenk, Faber, Gerb & Soffen

[57] ABSTRACT

A hydrodynamic brake is disclosed. It comprises a working chamber with a rotor and a stator in it. An inlet supplies fluid to the working chamber which tends to increase the braking torque. An outlet permits exit of fluid from the working chamber, which tends to decrease the braking torque. An overflow valve may be opened or closed to selectively permit or prohibit exit of working fluid from the working chamber outlet. A pressure source, such as the pressure in the working chamber, normally holds the overflow valve open. A regulating valve is connected by a pressurized connection with the overflow valve and the regulating valve selectively opens or closes the overflow valve. The regulating valve compares the desired braking torque, which is established by an operating lever for the brake, with the actual braking torque, and the regulating valve opens or closes the overflow valve for tending to bring the actual braking torque to the desired braking torque. The pressure source may communicate with the pressurized connection through the regulating valve.

29 Claims, 3 Drawing Figures

HIGH SPEED HYDRODYNAMIC BRAKE

BACKGROUND OF THE INVENTION

The present invention relates to hydrodynamic brakes and particularly to the type of hydrodynamic brake comprising a toroidal work chamber with a stator and a rotor housed therein.

It is known that the braking torque produced by a hydrodynamic brake increases with the square of the speed of rotation of the rotor for a constant degree of filling of the brake housing with pressure fluid. As a rule, however, the braking of, for instance, a car should take place with an at least approximately constant braking torque. Therefore, a control device must be provided to ensure that upon the application of the brake, a small degree of filling occurs initially and that the degree of filling increases continuously as the speed of rotation of the rotor decreases, possibly until the housing is completely filled.

FIG. 2 of German Unexamined Application for Patent (Offenlegungschrift) No. 21 20 743 discloses a hydrodynamic brake in which an overflow valve is arranged in the outlet conduit of the brake in order to regulate the degree of filling. The valve body of the overflow valve is displaceable in the "open" direction by a force produced by the hydraulic pressure in the outlet conduit and is displaceable in the "close" direction by a suitable opposing force. Pressure fluid present in a pressure chamber acts on the valve body of the overflow valve in the "close" direction. The pressure fluid is maintained by a precontrol valve at an adjustment pressure which is proportional to the desired value. As long as the brake operation takes place with the working chamber partially filled, the forces acting on the valve body of the overflow valve are in equilibrium. This means that the force produced by the hydraulic pressure in the brake outlet conduit is equal to the opposing force produced by the adjustment pressure. (If necessary the opposing force can be supplemented by the force of a spring.) Thus, as a result of the overflow valve, the pressure prevailing in the outlet conduit of the fluid brake is set to a value corresponding to the desired value.

However, it is primarily desirable that the hydrodynamic braking torque be maintained substantially constant at a desired value. This, however, is not possible with all brake designs, particularly designs including an overflow valve, as described above. For example, in brakes of some designs, it may happen that when a desired torque value is set, the hydrodynamic braking torque decreases when the speed of rotation decreases rather than, as is generally desired, remaining constant or increasing slightly.

FIG. 2 of West German Pat. No. 2,408,876, which corresponds to U.S. Pat. No. 3,989,127, discloses a hydrodynamic brake in which a regulating valve is provided instead of the above mentioned precontrol valve. A regulated adjustment pressure is produced in the regulating valve by comparison of the desired value with a control variable. The regulated adjustment pressure displaces to a greater or lesser extent the valve body of an adjustment valve, for controlling the inlet and outlet cross-sections of the brake. The control variable can be given a precisely determinable relationship to the hydrodynamic braking moment. Thus for instance the control variable can be made exactly proportional to the hydrodynamic braking moment over the entire range of speeds of rotation of the rotor.

This known hydrodynamic brake has been proved suitable for use in railway or highway vehicles, in which it is not necessary to obtain excessively high decelerations. On the other hand, in military cross-country vehicles, and particularly in heavy track-laying vehicles, extremely high decelerations are at times required. For example, a hydrodynamic brake may have to decelerate a vehicle having a weight of 50 tons from a speed of 70 km/h to a speed of 20 km/h within less than 3 seconds. The known hydrodynamic brake cannot satisfactorily perform such a task, because the known brake design requires a strong spring to give the adjustment valve body a high reset speed, and the adjustment pressure must operate against this strong reset spring. A large part of the adjustment pressure available is required merely to counterbalance the force of the spring, and the portion of the adjustment pressure which remains available for accelerating the valve body is relatively small. This fact reduces the reaction speed of the entire control device.

SUMMARY OF THE INVENTION

The object of the present invention is therefore to provide a hydrodynamic brake with which a braking torque of any value, and particularly an extremely high braking torque, can be attained from the unbraked condition within a very short period of time, i.e. substantially instantaneously, and in which the braking torque is maintained at least approximately constant, at the desired value, as long as braking continues.

Another object of the invention is to provide a hydrodynamic brake capable of braking quickly.

In order to achieve these objects, the present invention proceeds from the hydrodynamic brake of German Unexamined Application for Patent (Offenlegungsschrift) No. 21 20 743. According to the invention disclosed in that application, the outlet valve is an overflow valve whose valve body is acted on by hydraulic pressure on both sides, i.e. in both directions of motion, and which thus has a high speed of reaction.

According to the present invention, the braking torque of a hydrodynamic brake is controlled by means of an overflow valve in the outlet conduit of the brake. A regulator device, for example a regulator valve, separate from the overflow valve is provided. The extent to which the regulator valve of other regulator device is open controls the amount of flow permitted to occur through the overflow valve. The extent to which the regulator device is open is itself determined by a comparison of two forces, one of which represents the desired braking torque and the other of which is approximately proportional to the actual braking torque of the brake. The disadvantages of the brake known from the aforesaid German application which have been described above, are avoided by the present invention. The invention transfers the regulating process, which adjusts the braking torque, from the overflow valve to the separate regulating device, and this replaces the precontrol valve of the prior art. It has been found that with the invention, the dynamic behavior of the regulation of the braking torque satisfies the highest demands to be placed on it in use. Thus the braking torque can be adjusted from zero to any desired value, including the highest value possible with the brake, within a fraction of a second, and the rise in the braking torque is instantaneously terminated when the desired torque value is reached, without oscillations about the desired value.

Inlet and outlet channels of large volume and of hydrodynamically favorable shape and an inlet control valve which responds rapidly to control commands can be used to further improve the device of the invention. Furthermore, since the hydrodynamic brake is designed for the highest possible specific output, the braking torque characteristic for the 100% degree of filling should rise as steeply as possible in the torque-speed diagram.

In principle, regulating devices of different type can be used. However, it is preferred, as in known brakes, to use an hydraulic pressure as the adjustment variable and a pressure control valve as the regulating device.

Other objects and features of the invention can be understood from the following description and accompanying drawings.

DESCRIPTION OF THE PREFERRED EMBODIMENTS

Figure 1:
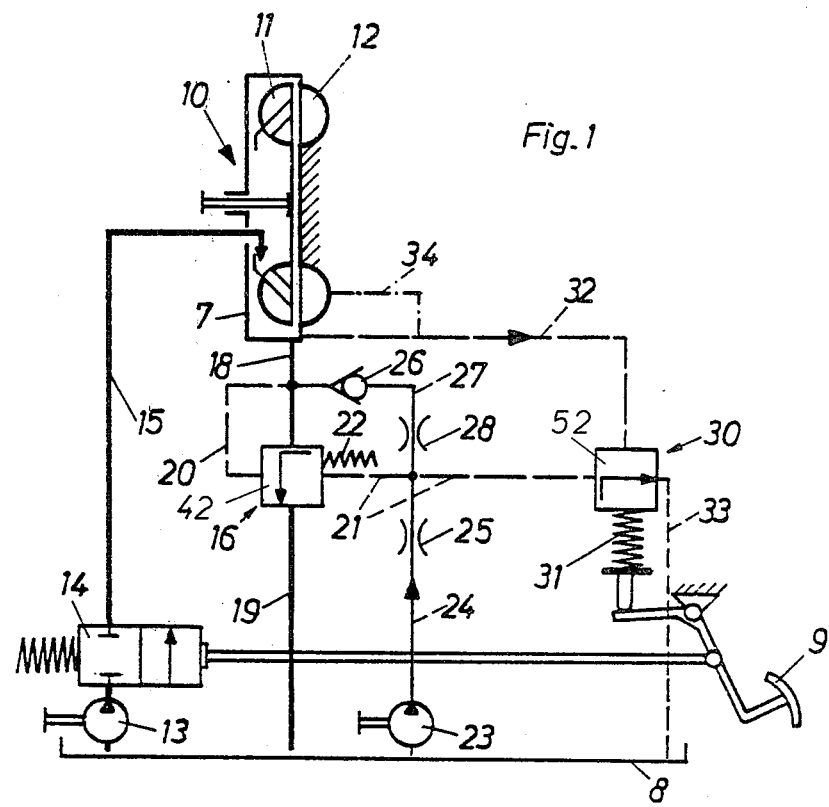
FIG. 1 is a schematic control diagram of one embodiment of the hydrodynamic brake according to the present invention.

In the embodiment of FIG. 1, the hydrodynamic brake 10 of the present invention comprises a housing or working chamber 7, a rotor 11 and a stator 12. The working chamber 7 is filled by means of a filling pump 13, which pumps fluid into the working chamber via a filling valve 14 and a filling line 15. One example of a hydrodynamic brake is found in U.S. Pat. No. 3,989,127. Upon depression of the brake pedal 9, the filling valve 14 is immediately opened fully. This connects the filling line 15 with the pump 13.

The working chamber 7 is drained via an outlet conduit 18, 19 in which an overflow valve 16 is arranged. For details as to one valve 16, see FIG. 3, which describes a different embodiment, but one which has many similarities to valve 16. The movable valve body 42 of valve 16 is represented by a square in FIG. 1.

The control conduit 20, drawn in dashed line in FIG. 1, is intended to indicate that the hydraulic pressure in the part 18 of the outlet conduit 18,19 acts on one end of the movable valve body 42 of the overflow valve 16 to move it in the valve "open" direction. The opposite end of the movable valve body 42 of valve 16 is acted on to move it in the opposite "close" direction by a pressure fluid fed via the control conduit 21, aided if necessary by a spring 22. Control conduit 21 is also shown in a dashed line in FIG. 1. In the region of this end of valve body 42, a pressure space 50 (as described for the embodiment of FIG. 3) is provided between the valve body 42 and the actual source of pressure fluid. The pressure space 50 is supplied with pressure fluid either by means of an auxiliary pump 23, via a conduit 24 having a throttle 25, or from the outlet conduit 18 via a non-return valve 26 and a conduit 27 having a throttle 28.

The overflow valve 16 is controlled by a regulating valve 30, which has a movable valve member 52 and is connected to the control conduit 21. The desired brake torque in brake 10 is established by the degree of deflection of the brake pedal 9. This deflection acts on the regulating valve 30 through a spring 31 to move the valve 30 in the "close" direction. As a result, the overflow valve 16 also remains closed since the force exerted in the "close" direction by the pressure in the control conduit 21 and by the spring 22 exceeds the force in the "open" direction exerted by the hydraulic pressure in the outlet conduit 18 (control conduit 20). Thus, the degree of filling of the brake housing 7 increases and the brake torque in the brake 10 rises. As the speed of rotation of the brake rotor 11 decreases, the actual brake torque of brake 10 would decrease. To increase actual brake torque, more working fluid is pumped into brake 10.

The brake torque in brake 10 is masured via measurement of the pressure in the pressure conduit 32 to the regulating valve 30, where the pressure in conduit 32 acts on the movable valve member 52, contrary to the force exerted by the spring 31. The spring 31 is of such a strength that as long as the brake torque in the brake 10 is less than what is required, the force exerted on the movable valve member 52 of valve 30 by the fluid in measurement conduit 32 will be less than that exerted by spring 31, and the spring 31 will keep valve 30 closed. As the pressure on pedal 9 increases, the force exerted by spring 31 increases and this will increases the fluid pressure in conduit 32 that is required to open the valve 30. As a result, the fluid in conduit 21 is unable to leave conduit 21, and this will keep valve 16 closed, allowing the brake 10 to continue filling and this causes the brake torque in the brake 10 to rise.

When the force exerted on the movable valve member 52 of valve 30 through conduit 32 exceeds the force exerted by spring 31, then, to the extent of that excess, valve 30 is opened. This allows fluid to pass through the valve 30 from conduit 21 to a sump 8 or another suitable low-pressure region via relief conduit 33. The loss of fluid from conduit 21 reduces the force acting on the valve body 42 of the overflow valve 16 sufficiently so that the overflow valve 16 is opened to a certain extent. This allows fluid to drain from the brake 10 via outlet conduit 18, 19 until the force exerted on the valve body of valve 30 by the fluid in the conduit 32 becomes equal to that exerted by spring 31, at which point the desired braking torque in brake 10 is achieved.

The measurement conduit 32 can be connected to the housing 7 of the brake 10 or, as indicated by the dot-dash line at 34, can be connected within the region of the stator 12 directly to the toroidal working chamber of the brake.

The two throttles 25 and 28 permit the regulating valve 30 to decrease the pressure in the control conduit 21 as necessary at the same time that pressure is being fed continuously through the conduit 24 or conduit 27.

Figure 2:
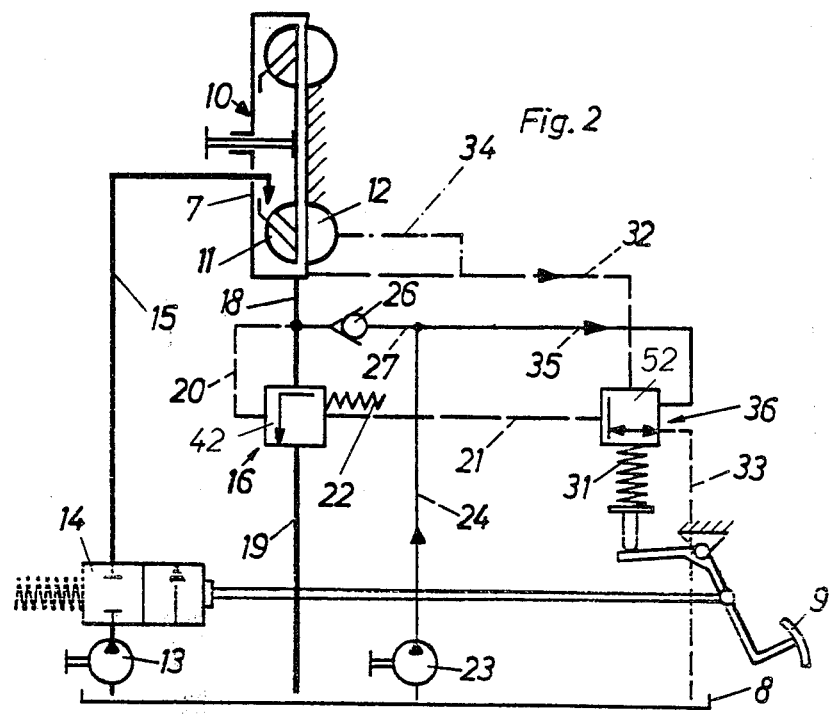
FIG. 2 is a schematic control diagram of another embodiment of the invention.

FIG. 2 shows a second embodiment of the invention that differs from the embodiment of FIG. 1 only in that pressure fluid is supplied to control conduit 21 through the regulating valve 36, which otherwise corresponds to valve 30, rather than directly from the brake outlet conduit 18 and the auxiliary pump 23. For this, the flows in conduit 24 and 27 of the embodiment of FIG. 1 are combined in a feed conduit 35, which discharges into the regulating valve 36. In this way, the control conduit 21 is only supplied with pressure fluid as long as the measurement pressure in conduit 32 is lower than desired. If the pressure in conduit 32 becomes too high, then a portion of the fluid in control conduit 21 is discharged via conduit 33, as in the embodiment of FIG. 1. As a result, the brake 10 of FIG. 2 reacts even faster than the embodiment of FIG. 1. The throttles 25 and 28 can be dispensed with in the embodiment of FIG. 2.

Figure 3:
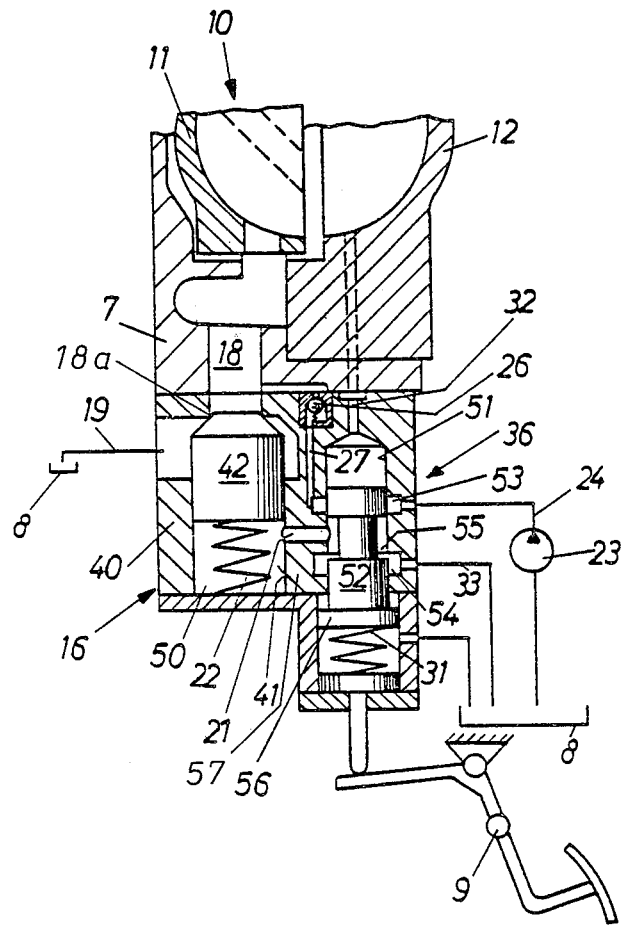
FIG. 3 is a partial section through a hydrodynamic brake of the embodiment of FIG. 2, showing the overflow valve and the corresponding regulating valve which may be used with this embodiment.

FIG. 3 shows one possible construction of the overflow valve 16 and the regulating valve 36. The valves 16 and 36 are housed in the same housing 40. A part of the hydrodynamic brake 10 with the rotor 11, the stator 12, the brake housing 7 and the outlet conduit 18 is shown. The valve housing 40 is integral with the brake housing 7. The housing 40 has a first bore 41 to receive the movable valve member 42 of the overflow valve 16 and the compression spring 22 beneath the valve member 42, which presses the valve member 42 up against its valve seat 18a. The part of the first bore 41 accommodating the spring 22 also serves as the pressure space 50. Portion 19 of the outlet conduit 18, 19 leads from the valve 16 to the sump 8.

The valve housing 40 has a second bore 51 in which the movable valve body 52 of the regulating valve 36 is accommodated. Two annular grooves 53 and 54 are provided in the wall of the second bore 51. Furthermore, the valve body 52 has an anular groove 55 about its middle portion. the width of grove 55 is equal to the distance between the two annular grooves 53 and 54. Control conduit 21 connects pressure space 50 in the first bore 41 with the second bore 51.

Brake pedal 9 presses valve body 52 upward (in FIG. 3) via spring 31, which is housed in second bore 51. Auxiliary pump 23 supplies pressure fluid to valve 36 via conduit 24, which opens into annular groove 53. Annular groove 53 performs the function of fed conduit 35 of FIG. 2. Conduit 27, which carries fluid from brake outlet conduit 18 to valve 36, also discharges into the annular groove 53. Relief conduit 33 leads from annular groove 54 to sump 8. The working chamber of the brake 10 communicates with the second bore 51 via measurement conduit 32. Pump 13, valve 14 and inlet conduit 15 have been omitted from FIG. 3.

FIG. 3 shows the brake in the condition of rest, i.e. the brake pedal 9 has not been deflected and the working chamber of the brake 10 is completely empty. In this condition the pressure in the pressure space 50 is relieved via the control conduit 21, the second bore 51, the annular groove 54, and the conduit 33 leading to the sump 8. The valve body 42 is pressed against the valve seat 18a by the force of the spring 22. The connection between the control conduit 21 and the conduit 24 is blocked by valve body 52.

Activation of the brake 10 is begun when the brake pedal 9 is depressed. Clockwise movement (in FIG. 3) of the pedal 9 pushes valve body 52 upward (as seen in FIG. 3) via the spring 31 until the collar 56 on the valve body 52 is stopped by shoulder 57 of the valve housing 40 that forms the top of the second bore 51. In this way, the spring 31 is prestressed to a greater or lesser extent depending on the deflection of the brake pedal 9. The stressing of spring 31 determines the braking torque. The pressure supplied by the auxiliary pump 23 is now transmitted via the conduit 24, the annular groove 53, the second bore 51, and the control conduit 21 into the pressure space 50 and acts in connection with the initial stress of the spring 22 on the valve body 42. The braking torque in the brake 10 itself is measured by the pressure entering bore 51 via conduit 32 and acting on the upper end surface of the regulating valve body 52. When this pressure overcomes the initial stress of the spring 31, the regulating valve body 52 again moves a distance downward. This results in the reduction of the pressure in pressure space 50 until the forces acting on the regulating valve body 52 are in equilibrium.

In FIG. 3, the bores 41 and 51 of the two valves 16 and 36 are arranged parallel to each other, but the axis of the second bore 51 could also extend perpendicular to the plane of the drawing.

Although preferred embodiments of the invention have been described in detail, many modifications and variations thereof will now be apparent to one skilled in the art. Accordingly, the scope of the present invention is to be limited not by the details of the preferred embodiments herein described but only by the appended claims.

What is claimed is:

1. A hydrodynamic brake comprising: a working chamber, which can be filled with working fluid; a rotor and a stator in said working chamber and positioned and operable such that working fluid in said working chamber operates on said rotor and said stator for causing braking torque; said working chamber having a working fluid outlet;

an overflow valve in said outlet for selectively permitting and prohibiting exit of working fluid from said working chamber through said outlet;

a regulating valve connected at a connection with said overflow valve for closing said overflow valve against flow out of said working chamber through said outlet and for opening said overflow valve; said regulating valve having a first condition at which said regulating valve closes said overflow valve; said regulating valve having a second condition at which said regulating valve causes said overflow valve to open for permitting outlet of working fluid from said working chamber through said outlet;

a brake operator for establishing a desired braking torque in said brake; said brake operator being connected with said regulating valve for adjusting said regulating valve to said first condition thereof;

said regulating valve also being connected with said working chamber for sensing the braking torque of said brake;

said regulating valve being adapted to compare the desired braking torque established by said brake operator with the actual braking torque in said brake, and said regulating valve adjusting its said condition to the selected first and second condition thereof which tends to equalize the two measurements of braking torque.

2. The hydrodynamic brake of claim 1, further comprising:

first means for normally opening said overflow valve for permitting flow through said outlet out of said working chamber; said regulating valve acting in opposition to said first means for closing said overflow valve against flow out of said working chamber through said outlet; at said regulating valve first condition, said regulating valve acts in opposition to said first means for closing said overflow valve; at said regulating valve second condition, said regulating valve permits said first means to open said overflow valve.

3. The hydrodynamic brake of claim 2, wherein said first means comprises a working fluid connection between said working chamber and said overflow valve;

second means for pressurizing said connection between said regulating and said overflow valves for acting in opposition to said first means.

4. The hydrodynamic brake of claim 1, wherein said regulating valve compares the desired level of brake torque with the actual level of brake torque in said brake by causing the pressures generated by the desired level and the actual level of braking torque to act in opposition to each other at said regulating valve.

5. The hydrodynamic brake of either of claims 1 or 4, wherein said working chamber has a working fluid inlet; said brake operator being connected with said braking fluid inlet for causing braking fluid to pass through said working fluid inlet into said working chamber, when said brake operator is operated for adjusting said regulating valve to said first condition thereof.

6. The hydrodynamic brake of either of claims 1 or 4, wherein said overflow valve is adapted to close upon said connection between said overflow valve and said regulating valve being pressurized; pressurizing means for pressurizing said connection between said regulating valve and said overflow valve for closing said overflow valve;

with said regulating valve in said first condition thereof, said regulating valve keeps said connection between said regulating valve and said overflow valve pressurized for causing closing said overflow valve; with said regulating valve in said second condition, said regulating valve permits the pressure in said connection to decrease, thereby causing said overflow valve to open for opening said working chamber outlet.

7. The hydrodynamic brake of claim 6, wherein said regulating valve comprises a chamber and comprises a valve body shiftable through said chamber; one side of said chamber at one side of said valve body being connected with said working chamber; said brake operator being connected with said valve body to shift said valve body in opposition to the shifting caused by increase in pressure in said chamber one side; said valve body of said regulating valve being moved into said valve regulating first condition by said brake operator and being moved into said regulating valve second condition by pressure in said chamber one side acting in opposition to said brake operator.

8. The hydrodynamic brake of claim 7, wherein said brake operator comprises a level which is operated to move and comprises a spring which is charged by movement of said lever; said spring being connected between said brake operator lever and said regulator valve body, such that as said spring of said brake operator is charged, said spring acts in opposition to pressure in said regulator valve chamber one side.

9. The hydrodynamic brake of claim 6, further comprising:

first means for normally opening said overflow valve for permitting flow through said outlet out of said working chamber; said regulating valve acting in opposition to said first means for closing said overflow valve against flow out of said working chamber through said outlet conduit; at said regulating valve first condition, said regulating valve acts in opposition to said first means for closing said overflow valve; at said regulating valve second condition, said regulating valve permits said first means to open said overflow valve.

10. The hydrodynamic brake of claim 9, wherein said first means comprises a working fluid connection between said working chamber and said overflow valve.

11. The hydrodynamic brake of claim 6, wherein said pressurizing means comprises a working fluid connection between said working chamber and said connection between said regulating and said overflow valves.

12. The hydrodynamic brake of claim 11, further comprising a nonreturn valve in said working fluid connection for blocking return of fluid pressure to said working chamber from said connection between said regulating and said overflow valves.

13. The hydrodynamic brake of claim 6, wherein said pressurizing means comprises a separate pressurizing device connected to said connection between said overflow and regulating valves.

14. The hydrodynamic brake of claim 13, wherein said pressurizing device communicates with said connection through said regulating valve, and said regulating valve opens the communication between said pressurizing device and said connection when said regulating valve is in said first condition.

15. The hydrodynamic brake of claim 14, wherein said regulating valve closes the communication between said pressurizing device and said connection when said regulating valve is in said second condition.

16. The hydrodynamic brake of claim 15, wherein said pressurizing means further comprises a working fluid connection between said working chamber and said connection between said regulating and said overflow valves.

17. The hydrodynamic brake of claim 16, further comprising a nonreturn valve in said working fluid connection for blocking return of fluid pressure to said working chamber from said connection between said regulating and said overflow valves.

18. The hydrodynamic brake of claim 15, further comprising a relief conduit communicating with said pressurized connection between said overflow and said regulating valves for relieving pressure in said connection; said relief conduit communicating with said connection through said regulating valve, such that when said regulating valve is in said second condition thereof, said relief conduit and said pressurized connection being in communication for relief of pressure in said pressurized connection.

19. The hydrodynamic brake of claim 18, wherein said pressurizing means comprises a working fluid connection between said working chamber and said connection between said regulating and said overflow valves.

20. The hydrodynamic brake of claim 6, further comprising a relief conduit communicating with said pressurized connection between said overflow and said regulating valves for relieving pressure in said connection; said relief conduit communicating with said connection through said regulating valve, such that when said regulating valve is in said second condition thereof, said relief conduit and said pressurized connection being in communication for relief of pressure in said pressurized connection.

21. The hydrodynamic brake of claim 4, wherein said regulating valve comprises a chamber and comprises a valve body shiftable through said chamber; one side of said chamber at one side of said valve body being connected with said working chamber; said brake operator being connected with said valve body to shift said valve body in opposition to the shifting caused by increase in pressure in said chamber one side, said valve body of said regulating valve being moved into said regulating valve first condition by said brake operator and being moved into said regulating valve second condition by pressure in said chamber one side acting in opposition to said brake operator.

22. The hydrodynamic brake of claim 21, wherein said working chamber has a working fluid inlet; said brake operator being connected with said braking fluid inlet for causing braking fluid to pass through said working fluid inlet into said working chamber, when said brake operator is operated for adjusting said regulating valve to said first condition thereof.

23. The hydrodynamic brake of claim 22, wherein said brake operator comprises a lever which is operated to move and comprises a spring which is charged by movement of said lever; said spring being connected between said brake operator lever and said regulator valve body, such that as said spring of said brake operator is charged, said spring acts in opposition to pressure in said regulator valve chamber one side.

24. A hydrodynamic brake, comprising:
a working chamber, which can be filled with working fluid; a rotor and a stator in said working chamber, and positioned and operable such that working fluid in said working chamber operates on said rotor and said stator for causing braking torque; said working chamber having a working fluid outlet;
an overflow valve in said outlet for selectively permitting and prohibiting exit of working fluid from said working chamber through said outlet;
regulating means connected with said overflow valve for operating said overflow valve; said regulating means having a first condition for operating said overflow valve to prohibit exit of working fluid from said working chamber; said regulating means having a second condition for operating said overflow valve to permit exit of working fluid from said working chamber;
a brake operator for establishing a desired braking torque in said brake; said brake operator being connected with said regulating means for adjusting said regulating means to said first condition thereof;
said regulating means also being connected with said working chamber for sensing the braking torque of said brake;
said regulating means being adapted to compare the desired braking torque established by said brake operator with the actual braking torque of said brake, and said regulating means adjusting its condition to the selected first and second condition thereof which tends to equalize the two measurements of braking torque.

25. The hydrodynamic brake of claim 24, wherein said working chamber has a working fluid inlet; said brake operator being connected with said braking fluid inlet for causing braking fluid to pass through said working fluid inlet into said working chamber, when said brake operator is operated for adjusting said regulating means to said first condition thereof.

26. The hydrodynamic brake of either of claims 24 or 25, further comprising a connection between said regulating means and said overflow valve by which they are connected; said overflow valve being adapted to close upon said connection being pressurized; pressurizing means for pressurizing said connection between said regulating means and said overflow valve for operating said overflow valve to prohibit exit of working fluid from said working chamber;
with said regulating means in said first condition thereof, said regulating means keeps said connection between said regulating means and said overflow valve pressurized for operating said overflow valve to prohibit exit of working fluid from said working chamber; with said regulating means in said second condition, said regulating means permits the pressure in said connection to decrease, thereby causing said overflow valve to permit exit of working fluid from said working chamber through said outlet.

27. The hydrodynamic brake of claim 26, wherein said pressurizing means comprises a separate pressurizing device connected to said connection.

28. The hydrodynamic brake of claim 27, wherein said pressurizing device communicates with said connection through said regulating means; said regulating means opens the communication between said pressurizing device and said connection when said regulating means is in said first condition; said regulating means closes the communication between said pressurizing device and said connection when said regulating means is in said second condition.

29. The hydrodynamic brake of claim 28, wherein said pressurizing means further comprises a working fluid connection between said working chamber and said connection between said regulating means and said overflow valve;
a non-return valve in said working fluid connection for blocking return of fluid pressure to said working chamber from said connection.

* * * * *